Oct. 5, 1965 S. O. SHUMAKER 3,209,626
WIRE CLAMPING TOOL
Filed March 26, 1963 2 Sheets-Sheet 1
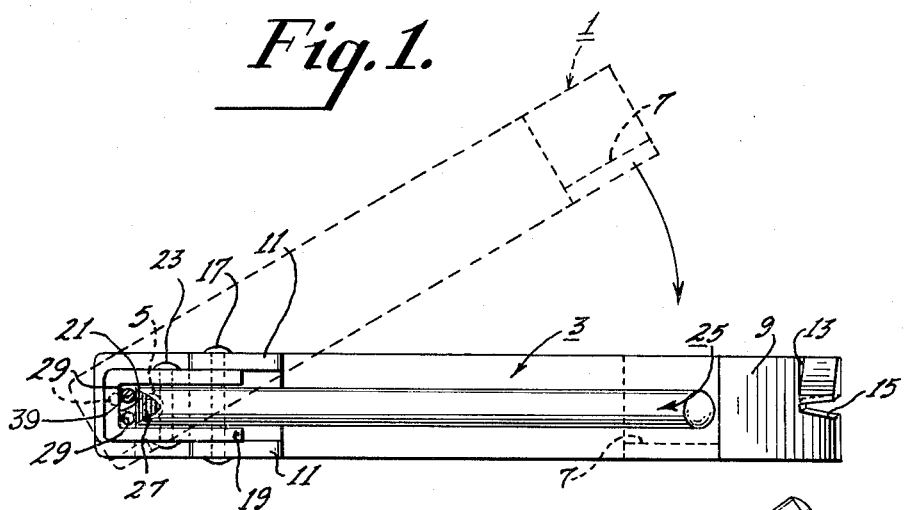
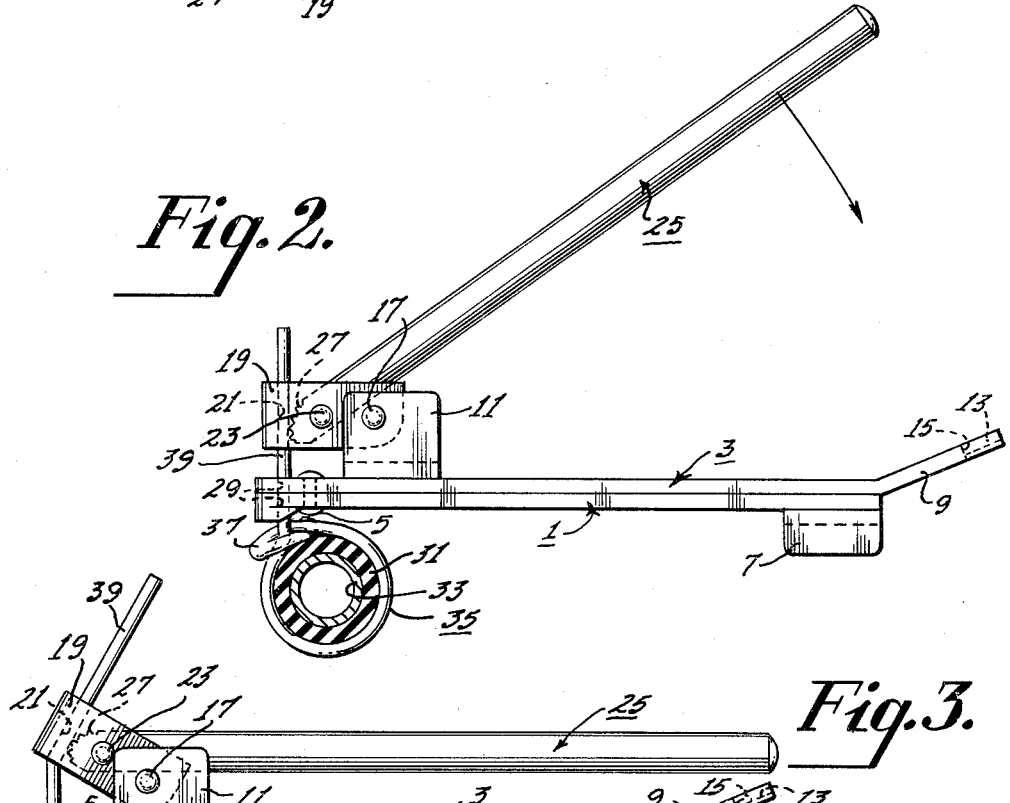
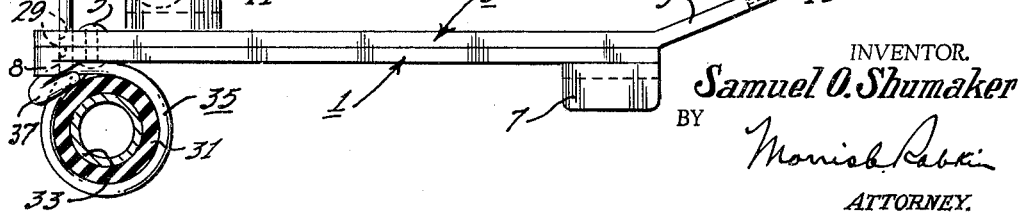
INVENTOR.
Samuel O. Shumaker
BY
ATTORNEY.

Oct. 5, 1965        S. O. SHUMAKER        3,209,626
WIRE CLAMPING TOOL
Filed March 26, 1963                    2 Sheets-Sheet 2
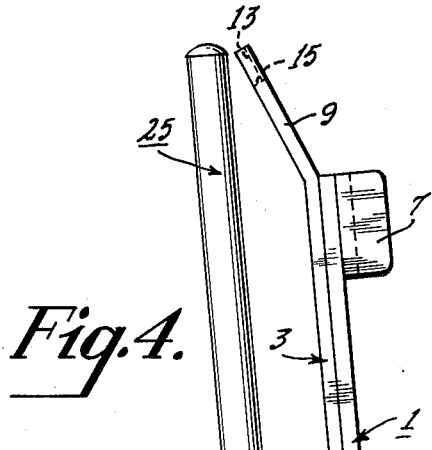
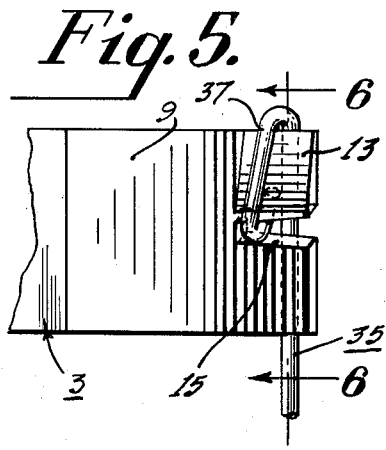
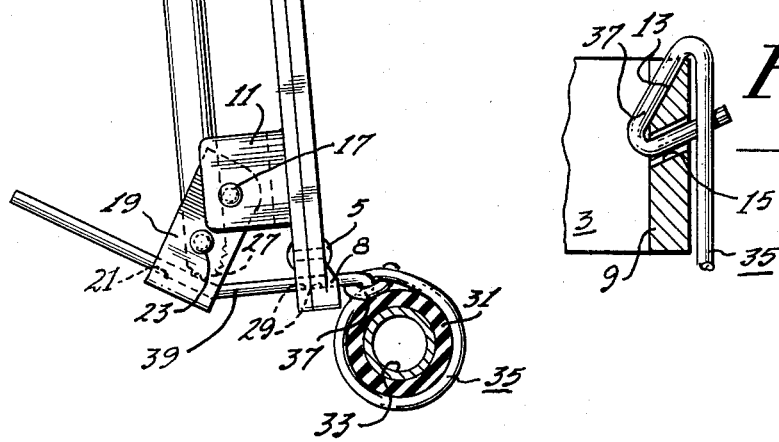
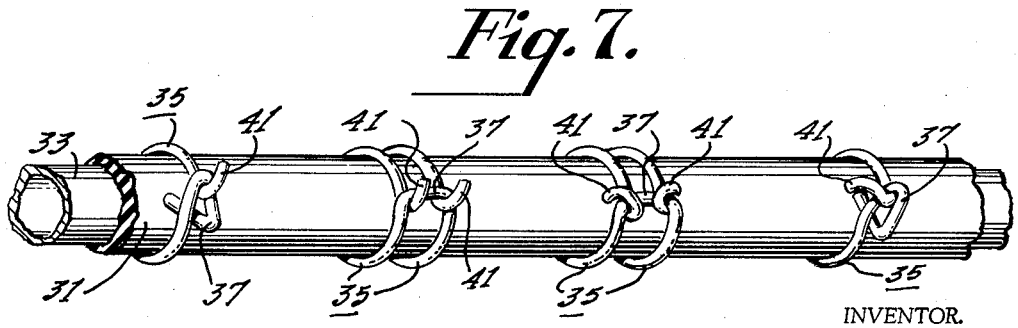
INVENTOR.
Samuel O. Shumaker
BY
ATTORNEY.

United States Patent Office 3,209,626
Patented Oct. 5, 1965

3,209,626
WIRE CLAMPING TOOL
Samuel O. Shumaker, 1508 Seaway Drive, Fort Pierce, Fla.
Filed Mar. 26, 1963, Ser. No. 268,197
9 Claims. (Cl. 81—9.3)

This invention relates to a tool for clamping wire firmly about various objects to thereby secure them to other objects or to each other. More particularly, the present invention relates to a tool for binding objects tightly with wire, either in a single strand or in a double strand, to hold them together securely.

Various wire clamping devices have been proposed heretofore for applying wire clamps around garden hoses, and the like. Many such devices are cumbersome and more or less difficult to use, as well as being expensive. Less cumbersome devices of this sort which are also relatively less expensive more often than not fail to provide tight enough clamps for intended purposes. Aside from the foregoing, there are some cases where a single strand wire clamp suffices for a particular purpose, whereas in other cases, a multiple strand clamp is desirable. So far as I am aware, no tools have been provided heretofore which can form either a single strand clamp or a multiple strand clamp at the will of the user.

The primary object of the present invention is to provide an improved, durable, lightweight tool for firmly clamping wire around various objects in a facile and efficient manner.

More particularly, it is an object of the present invention to provide an improved wire clamping tool for tightly binding wire around various objects, either in a single strand or in a double strand, to thereby secure them to other objects, as in clamping a garden hose to a coupling, a nozzle or a nipple, irrespective of the hose diameter, or to bind a plurality of like objects in groups, as in binding shingle stacks or the like.

Another object of this invention is to provide an improved wire clamping tool as aforesaid which will cut the clamping wire to the proper length necessary for a clamp regardless of the size of the objects to be clamped, and whether in a single or a double strand, and which will form a neat, strong, durable, yet inexpensive, clamp.

Still another object of this invention is to provide an improved wire clamping tool as set forth above which can be manipulated easily with one hand.

A further object of this invention is to provide an improved wire clamping tool which will securely apply the wire clamp to the objects to be bound together without danger of the wire slipping during the application thereof.

It is also an object of the present invention to provide an improved wire clamping tool of the character set forth which is simple and compact in construction, which is easy to manipulate, which is highly effective in use, and which is inexpensive in cost.

In accordance with one form of the invention, the clamping tool comprises a base plate formed with at least one shear opening therethrough near one end thereof. Pivotally connected to the base plate and normally overlying the base plate in substantially aligned relation therewith is a shear plate which also has at least one shear opening therethrough in alignment or registry with the base plate shear opening when the two plates are in aligned relation. The two shear openings are then adapted to receive therethrough a length of wire which has a closed loop at one end and which is unlooped or free at the other end. The two plates are adapted to be moved in scissors-like fashion in their respective planes to be swung into angular relation with each other. Thus, a wire threaded through the two shear openings will become sheared.

Pivotally mounted on the shear plate is a yoke for also receiving the wire, and pivotally carried by the yoke is a clamping lever formed with a serrated cam for cooperation with the end wall of the yoke. To clamp the wire tightly around an object, the wire is first placed around the object and its free end is passed through the loop at the other end thereof and then through the two shear openings and through the yoke. With the clamping lever raised so that its serrated cam will be clear of the wire, the tool is then moved down along the wire until the lower surface of the base plate engages the wire loop. The clamping lever is then swung down to bring its serrated cam against the wire and clamp the wire firmly against the yoke wall.

Further downward movement of the clamping lever eventually brings it into engagement with the pivot pin of the yoke. Continued downward movement of the lever then causes the lever to tilt about the yoke pivot pin and thus cause the yoke to rock or tilt on its pivot pin along with the lever whereby to exert an upward pull of the wire through its loop. In this way, the wire is pulled and clamped tightly around the object. When the desired tension on the wire clamp has been achieved, the tool is tilted as a whole in a direction to bend the portion of the wire just beyond the loop over that loop while still retaining the wire under tension. Thus, a clinching tail is formed over and beyond the loop of the wire, the tail being pressed against the loop to retain the wire under tension and in clamping relation with the object. The shear plate is then moved out of alignment with the base plate into such angular relation therewith as to cause its shear opening to shear off the wire beyond the tail which is left disposed over the wire loop to hold the wire clamp in place around the now clamped object.

The novel features of the invention, both as to its organization and method of operation, as well as additional objects and advantages thereof, will be more readily apparent from the following description, when read in connection with the accompanying drawings in which FIG. 1 is a plan view of one form of wire clamping tool according to the present invention, FIG. 2 is a side elevation thereof with the wire tightening lever in the position prior to tightening the wire to form the clamp, FIG. 3 is a view similar to FIG. 2 but showing the wire tightening lever in the position after it has drawn the wire tight around the object being clamped, FIG. 4 is a view similar to FIG. 3 but showing the tool in the position to which it is moved to bend the free end of the wire into fastening position, FIG. 5 is a fragmentary plan view of the end of the tool at which a loop is formed at one end of a single strand wire clamp before it is placed around the object to be clamped, FIG. 6 is a sectional view taken along the line 6—6 of FIG. 5 and viewed in the direction of the appended arrows, and FIG. 7 is a fragmentary view of a length of hose clamped to a conduit with various forms of single strand and double strand wire clamps according to the present invention.

Referring more particularly to the drawings, there is shown a wire clamping tool having a base plate 1 and a shear plate 3 overlying the base plate in a plane parallel to that of the base plate. The plates 1 and 3 are pinned together somewhat loosely near one end by a rivet or other suitable pivot pin 5 for relative pivotal or swinging movement in their respective planes in scissors-like fashion. Normally, the plates 1 and 3 are disposed in substantially aligned relation with each other. However, by reason of their pivotal connection 5, they can be moved relative to each other from their aligned relation, as shown by the solid lines in FIG. 1, to an angular relation, as illustrated by the dotted line position of the base plate 1 in FIG. 1 in relation to the solid line position of the shear plate 3.

At the end thereof adjacent to the pivot pin 5, the base plate 1 preferably has a short, underturned, reverse fold 8 that is tapered at its end for a purpose indicated hereinafter. At its other end, the base plate has a downwardly extending thumb piece 7 which is engageable by the thumb of a user's hand to apply a force thereto in one direction. At its corresponding end, the shear plate 3 has an upwardly inclined, angular end portion 9 which extends beyond the adjacent end of the base plate 1 and is adapted to be engaged by one or more fingers of the user's hand to apply a force thereto in the opposite direction. The application of these opposing forces is what causes the plates 1 and 3 to be displaced from their normally aligned relation to their aforementioned angular relation for a purpose presently to be set forth.

The shear plate 3 also has a pair of opposed, upstanding lugs 11 along the opposite, longitudinal edges thereof and in proximity to the pivot pin 5. Also, the angular end portion 9 of the shear plate 3 may be formed with a short taper or bevel 13 along one edge thereof and with a short, longitudinally extending slot 15. The purpose of the bevel 13 and the slot 15 will also be pointed out hereinafter.

The lugs 11 carry a pin 17 on which is pivotally mounted a U-shaped yoke 19 having an end wall 21. The yoke 19, in turn, carries a pin 23 on which is pivotally mounted an elongated clamping lever 25. At its end adjacent the yoke wall 21, the lever 25 is formed with a wire engaging cam 27 preferably having teeth or serrations for biting into the wire to provide a good grip thereon. The yoke 19 and the clamping lever 25 are so located that the wall 21 of the yoke and the clamping cam 27 of the lever 25 are in proximity to two pairs of normally aligned shear openings 29 which extend through the plates 1 and 3 in proximity to the pivot pin 5, and through which one or both ends of a clamping wire can be threaded, depending on whether a single strand wire clamp or a double strand wire clamp is to be formed.

Let it be assumed, first, that a single strand clamp is to be applied around a rubber hose 31 on a nipple or coupling 33 for clamping the hose to the member 33. A suitable length of wire 35 somewhat in excess of that necessary for the clamp is first cut from a supply of wire. The piece of wire is then inserted into the slot 15 near one end thereof to be held therein, and the wire is bent, first over onto the top surface of the shear plate angular end portion 9, then around the bevel 13 thereof, and finally over onto the opposite surface of the shear plate portion 9, as shown in FIGS. 5 and 6. Thus, there is formed a loop 37 at one end of the wire 35. The other end portion 39 of the wire remains free. The wire is then wrapped around the hose 31 and its free end portion 39 is threaded through the loop 37.

When the plates 1 and 3 are in their solid line, aligned relation shown in FIG. 1, the two openings 29 of each pair are also aligned, or in registry, with each other. Also, when the clamping lever 25 is in its raised (i.e., most counter-clockwise) position and the yoke 19 is also in its most counter-clockwise position, as shown in FIG. 2, there is sufficient clearance between the cam 27 of the clamping lever and the wall 21 of the yoke for free reception of the wire end portion 39 therebetween. After the end portion 39 of the wire 35 has been threaded through the loop 37 thereof, it is inserted through the two registering openings of one pair of openings 29 and up into the space between the wall 21 and the cam 27 until the loop 37 engages the taper of the fold 8 of the base plate 1. The clamping lever 25 is then tilted clockwise on its pivot pin 23 to bring its serrated cam 27 up against the wire end portion 39 and clamp the latter firmly against the yoke wall 21 and thereby grip it firmly. Continued clockwise tilting of the clamping lever 25 eventually brings it into engagement with the pin 17, whereupon the lever 25, in its further clockwise movement, then rocks on the pin 17 and thus tilts or rocks the yoke 19 clockwise about its pivot pin 17. Thus, an upward pull is exerted on the wire end portion 39 to draw the wire intermediate portion further through the loop 37 and tightly around the hose 31 to thereby firmly clamp the hose onto the nipple or coupling 33, as shown in FIG. 3. The taper at the end of the fold 8 permits engagement of the tool with the loop 27 at such an angle that the pull on the wire end portion 39 is practically straight upwardly, thus insuring a tighter clamping of the wire around the hose without danger of breaking the wire. When the desired tension on the wire has been achieved, the tool, as a whole, is tilted counter-clockwise from the position of FIG. 3 to that of FIG. 4 while still retaining the wire end portion 39 clamped between the yoke wall 21 and the cam 27. This causes the wire intermediate portion to be bent over the loop 37 and provides a clinching tail 41 which is more or less clinched over the loop 37. The thumb is then placed against the thumb piece 7 and one or two fingers (the index and the middle fingers, for example) are placed against the shear plate angular portion along the opposite edge thereof to apply opposing forces to the plates 1 and 3. This moves the plates into their angular relation and the free end portion of the wire is sheared off beyond the tail 41 by reason of the relative displacement of the openings 29 through which the wire end portion 39 has been threaded. Thus, the tail 41 is left disposed over the loop 37 to hold the wire clamp in place on the hose 31. If the tail 41 is not sufficiently clinched against the loop 37, it may be squeezed more forcefully against the latter by means of pliers, or by tapping it with a hammer.

Where a double strand clamp is desired, a suitable length of wire is reversely bent at approximately its middle to provide the loop 37, as shown in FIG. 7, and two free end portions therebeyond. The two strands of wire clamp are then wrapped around the hose and the two free end portions are threaded through the wire loop, after which each end portion is inserted through a different pair of aligned or registering openings 29 in the plates 1 and 3. From there on, the procedure follows as above described to provide two clinching tails over the loop.

From the foregoing description, it will be apparent that I have provided an improved wire clamping tool that can readily form either single strand or double strand clamps of wire and that can be handled easily to provide tight clamps around objects. This tool can cut the wire strands to desired length by a simple, manual mainpulation and without need to remove the tool from working position, as is the case with prior art tools. Thus, the wire need not be pulled out of the tool, as in such prior art tools, so that the likelihood of the clamp becoming loose before the clinching operation is eliminated. On the contrary, the improved tool of the present invention insures a firm, tight clamp during the wire tightening operation by reason of the fact that the fold 8 engages and presses firmly against the loop 37 and the hose 31, thus effectively anchoring the loop on the hose to insure holding the wire in place.

Although I have shown and described but a single embodiment of the invention, it will undoubtedly be apparent to those skilled in the art that other forms thereof, as well as variations in the one described herein, all coming within the spirit of my invention, are possible. I desire, therefore, that the foregoing shall be taken merely as illustrative and not in a limiting sense.

I claim as my invention:

1. A tool for clamping around an object a wire having a loop therein and a free end portion threaded through said loop, said tool comprising a plate structure including a pair of relatively movable plates having normally aligned shear openings therethrough for reception of said wire free end portion therein when said plates occupy a first relative position, and means carried by said plate structure for gripping said end portion and tightening said wire around said object, said gripping means comprising a yoke member on said plate structure positioned to receive therein said free wire end portion when said end portion is threaded through said shear openings, said yoke member having a wall against which said wire end portion can be clamped, and a clamping member on said plate structure cooperable with said yoke member to clamp said wire end portion firmly against said wall, said tool being tiltable as a whole about said loop after tightening of said wire around said object to bend said free end portion tightly over said loop and provide a clinching tail of said wire over said loop, and said plates then being movable relative to each other to another position for displacing said openings from their said aligned relation to thereby shear said wire free end portion beyond said tail and thus leave said tail disposed over said loop.

2. A tool for clamping around an object a wire having a loop therein and a free end portion threaded through said loop, said tool comprising a pair of pivotally connected plates normally overlying each other but being relatively displaceable in scissors-like fashion into non-aligned relation, said plates having shear openings therein disposed to be aligned with each other when said plates overlie each other and being then adapted to receive said wire end portion therethrough, and means carried by one of said plates for gripping said end portion and pulling thereon to tighten said wire around said object, said tool then being tiltable as a whole about said loop to bend said free end portion tightly over said loop and provide a clinching tail of said wire over said loop, and said plates being then displaceable toward their said non-aligned relation to thereby displace said openings from each other and thereby shear said wire free end portion beyond said tail and thus leave said tail disposed over said loop.

3. A tool according to claim 2 wherein said wire gripping and tightening means comprises a yoke member on one of said plates positioned thereon to receive said wire free end portion when said end portion is threaded through said shear openings, said yoke member having a wall in proximity to said openings against which said wire end portion can be clamped, and a clamping member on said last named plate cooperable with said yoke member to clamp said wire end portion firmly against said wall.

4. A tool according to claim 2 wherein said wire gripping and tightening means comprises a yoke member pivotally carried by one of said plates and positioned thereon to receive said wire free end portion when said end portion is threaded through said shear openings, said yoke member having a wall in proximity to said openings against which said wire end portion can be clamped, and a clamping lever also pivotally carried by said last named plate cooperable with said yoke member to clamp said wire end portion firmly against said wall, said clamping lever being tiltable after clamping said wire end portion against said wall to thereby cause said yoke member to tilt and thus draw said wire tightly around said object.

5. A tool according to claim 2 wherein said one plate has a pair of upstanding lugs thereon and a pivot pin carried by said lugs, and wherein said wire gripping and tightening means comprises a yoke member pivotally mounted on said pivot pin to receive said wire free end portion after said end portion is threaded through said shear openings, said yoke member having a wall in proximity to said openings against which said wire end portion can be clamped, and a clamping lever pivotally mounted on said yoke member and having a wire engaging portion for cooperation with said yoke member, said clamping lever, when in one position, having its said wire engaging portion spaced from said yoke member wall a distance sufficient to permit free insertion of said wire end portion therebetween, said clamping lever then being tiltable on said yoke member to bring its said wire engaging portion against said wire end portion and clamp the latter against said wall, and said clamping lever then being further tiltable into engagement with said pivot pin to pivot thereon and thus rock said yoke member on said pivot pin to thereby pull on said wire end portion and thus tighten said wire around said object.

6. A tool according to claim 5 wherein said clamping lever wire engaging portion comprises a cam surface at the end of said lever closest to said yoke member wall.

7. A tool for clamping around an object a wire wrapped therearound, said wire having (1) a loop therein, (2) an intermediate portion threaded through said loop, and (3) a free end portion beyond said intermediate portion, said tool comprising a base plate having at least one shear opening therethrough in proximity to one end thereof for reception of said wire end portion, a shear plate overlying and normally disposed in substantially aligned relation with said base plate, means pivotally connecting said plates for swinging movement relative to each other in parallel planes from one to the other of said aligned relation and an angular relation, said shear plate also having at least one shear opening therethrough in proximity to the corresponding end thereof for also receiving said wire end portion, said shear openings being so located on their respective said plates relative to said plate connecting means that they are in registry with each other when said plates are in their said aligned relation but become displaced from each other when said plates are swung into their said angular relation whereby a wire threaded through said openings will become sheared, and tiltable clamping means carried by said shear plate for gripping said wire free end portion and pulling thereon upon being tilted to draw said wire intermediate portion tightly through said loop and thus draw said wire around said object into tightly clamping relation therewith prior to swinging said plates to their said angular relation, said tool then being tiltable as a whole about said loop to bend said wire intermediate portion over said loop and provide a clinching tail in said intermediate portion over said loop, said plates being then swingable into their said angular relation to thereby shear off said wire end portion beyond said tail and leave said tail disposed over said loop.

8. A tool according to claim 7 wherein said shear plate extends beyond said base plate at the end thereof opposite to said first mentioned end thereof for engagement by at least the index finger of a hand to apply a force thereagainst in one direction, and wherein said base plate includes a thumb piece for engagement by the thumb to apply a force to said base plate in the opposite direction, the application of said opposing forces causing said plates to be displaced from their said aligned relation to their said angular relation to thereupon shear said wire free end portion.

9. A tool according to claim 7 wherein said base plate has an underturned, reverse fold therein at said one end thereof, said fold terminating in a taper for engagement by said loop when said tool is applied to said wire.

References Cited by the Examiner

UNITED STATES PATENTS

| | | | |
|---|---|---|---|
| 402,673 | 5/89 | Hudson | 81—9.3 |
| 696,292 | 3/02 | Woodhouse | 254—25 |
| 1,187,355 | 6/16 | McVoy | 81—9.3 |
| 1,230,123 | 6/17 | Connelly. | |
| 1,619,766 | 3/27 | Riordan et al. | 81—9.3 |
| 1,815,114 | 7/31 | Petersen et al. | 254—25 |
| 2,498,458 | 2/50 | Schwork | 254—25 |
| 2,622,460 | 12/52 | Keeble | 81—9.3 |
| 2,623,424 | 12/52 | Ackerman | 81—9.3 |
| 2,631,617 | 3/53 | Drayer | 140—117 X |
| 2,653,498 | 9/53 | Truesdell | 81—9.3 |
| 2,871,738 | 2/59 | Abbiati | 81—9.3 |
| 2,882,934 | 4/59 | Gerrard | 81—9.3 X |
| 3,047,945 | 8/62 | Logan. | |

FOREIGN PATENTS 127,352   4/48   Australia.

WILLIAM FELDMAN, *Primary Examiner.*

MILTON S. MEHR, *Examiner.*